(12) United States Patent
Hofmann

(10) Patent No.: US 10,213,886 B2
(45) Date of Patent: Feb. 26, 2019

(54) METHOD FOR MAKING TOOLS AND/OR HANDLING EQUIPMENT AVAILABLE, AND ASSOCIATED DEVICES

(71) Applicant: Klaus Hofmann, Bruck (DE)

(72) Inventor: Klaus Hofmann, Bruck (DE)

( * ) Notice: Subject to any disclaimer, the term of this patent is extended or adjusted under 35 U.S.C. 154(b) by 193 days.

(21) Appl. No.: 14/899,095

(22) PCT Filed: Jun. 18, 2014

(86) PCT No.: PCT/DE2014/100201
§ 371 (c)(1),
(2) Date: Dec. 16, 2015

(87) PCT Pub. No.: WO2014/202054
PCT Pub. Date: Dec. 24, 2014

(65) Prior Publication Data
US 2016/0114444 A1 Apr. 28, 2016

(30) Foreign Application Priority Data
Jun. 19, 2013 (DE) .................. 10 2013 106 427

(51) Int. Cl.
*B23Q 3/157* (2006.01)
*B23Q 7/10* (2006.01)
*B23Q 7/04* (2006.01)
*B23Q 3/155* (2006.01)
(Continued)

(52) U.S. Cl.
CPC ..... *B23Q 3/15526* (2013.01); *B23Q 3/15536* (2016.11); *B23Q 3/15539* (2016.11); *B23Q 7/046* (2013.01); *B23Q 7/10* (2013.01); *B23Q 7/1426* (2013.01); *B65G 47/90* (2013.01); *B23Q 3/15503* (2016.11); *B23Q 3/15546* (2013.01); *Y10T 29/5196* (2015.01); *Y10T 483/10* (2015.01); *Y10T 483/134* (2015.01);
(Continued)

(58) Field of Classification Search
CPC ........ Y10T 483/16; B23Q 2003/15537; B23Q 3/15503; B23Q 3/15536; B23Q 7/10; B23Q 3/15539
USPC ...................................... 483/14, 1
See application file for complete search history.

(56) References Cited

U.S. PATENT DOCUMENTS 4,587,716 A 5/1986 Bytow
4,845,835 A * 7/1989 Schneider ................ B23H 7/26
414/1
(Continued)

FOREIGN PATENT DOCUMENTS

DE  2060957 A1  5/1972
DE  33 20 762 A1  12/1984
(Continued)

OTHER PUBLICATIONS

International Search Report for Application No. PCT/DE2014/100201, dated Oct. 1, 2014.
(Continued)

*Primary Examiner* — Erica E Cadugan
(74) *Attorney, Agent, or Firm* — Knobbe, Martens, Olson & Bear, LLP

(57) ABSTRACT

The invention relates to a method and a device for making tools and/or handling equipment available for a treatment machine, wherein a mobile magazine contains at least two different types of tools and/or handling equipment together.

13 Claims, 8 Drawing Sheets

(51) Int. Cl.
  *B23Q 7/14* (2006.01)
  *B65G 47/90* (2006.01)
(52) U.S. Cl.
  CPC ............ *Y10T 483/16* (2015.01); *Y10T 483/18* (2015.01); *Y10T 483/1845* (2015.01)

(56) References Cited

U.S. PATENT DOCUMENTS

| | | | | |
|---|---|---|---|---|
| 5,281,194 | A | * | 1/1994 | Schneider .......... B23Q 3/15526 211/1.52 |
| 5,803,886 | A | * | 9/1998 | Schweizer ............. B23Q 7/045 483/31 |
| 2008/0040911 | A1 | * | 2/2008 | De Koning ...... G05B 19/41825 483/1 |
| 2011/0194917 | A1 | | 8/2011 | Miksch |

FOREIGN PATENT DOCUMENTS

| | | |
|---|---|---|
| DE | 20 2005 012 039 U1 | 12/2006 |
| DE | 10 2009 035 121 A1 | 2/2011 |
| DE | 10 2010 001 724 A1 | 8/2011 |
| EP | 0517651 A1 | 12/1992 |
| EP | 1927430 A2 | 6/2008 |
| JP | S56-126552 | 10/1981 |
| JP | 60-46829 | 3/1985 |
| JP | 04-105845 | 4/1992 |
| JP | 04-115855 | 4/1992 |
| JP | 05-177516 | 7/1993 |
| JP | 2008-517788 | 5/2008 |
| WO | WO 2007/012366 | 2/2007 |

OTHER PUBLICATIONS

Office Action issued in German patent application No. 10 2013 106 427.2 dated Jun. 23, 2016.
Office Action issued in Japanese Patent Application No. 2016-520282 dated May 15, 2018.
Decision of Rejection dated Nov. 13, 2018 for Japanese Patent Application No. 2016-520282.

* cited by examiner

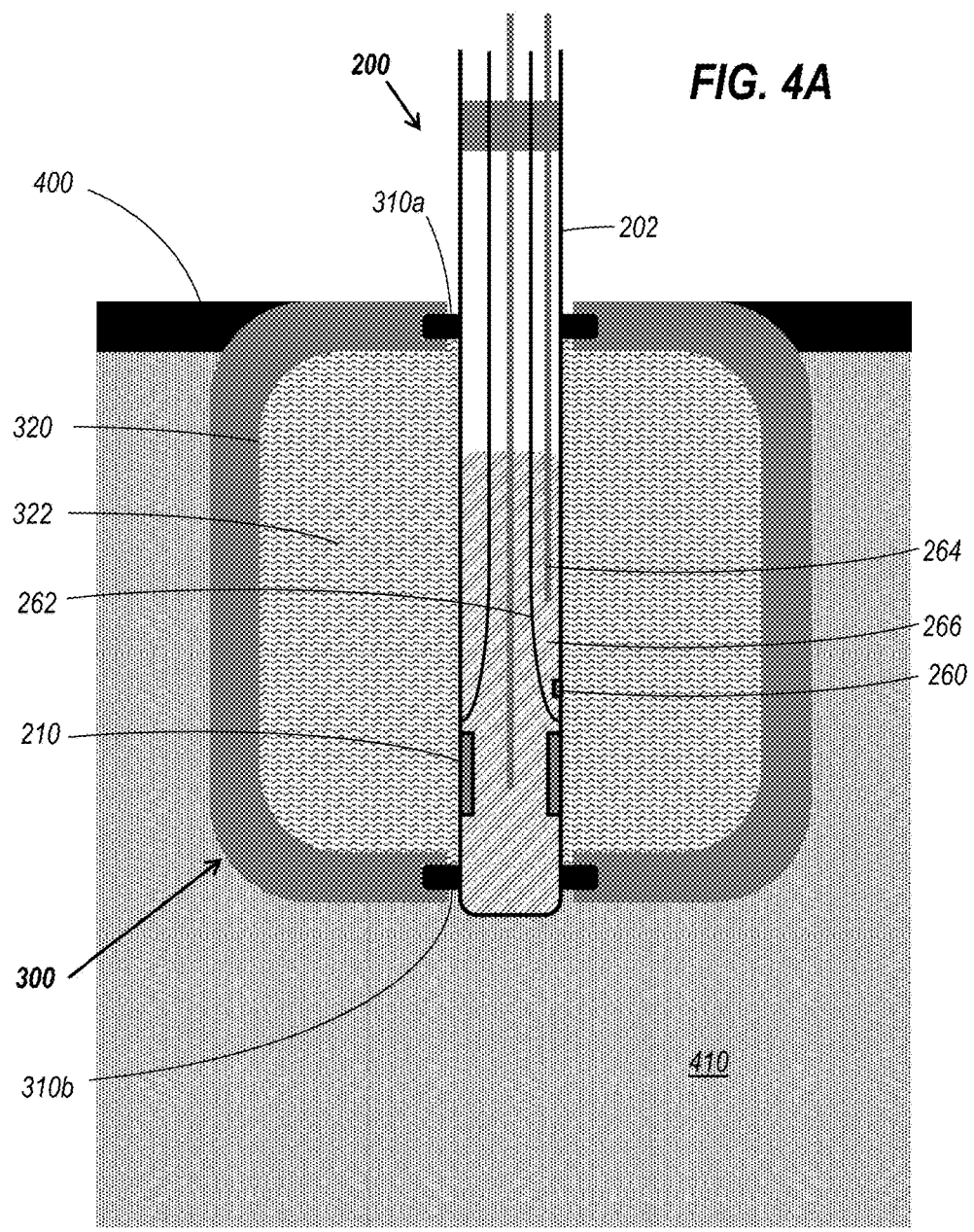

METHOD FOR MAKING TOOLS AND/OR HANDLING EQUIPMENT AVAILABLE, AND ASSOCIATED DEVICES

RELATED APPLICATIONS

This application is a U.S. National Phase under 35 U.S.C. § 371 of the International Patent Application No. PCT/DE2014/100201, filed Jun. 18, 2014, and published on Dec. 24, 2014 as WO 2014/202054, which claims the benefit of German Patent Application No. 10 2013 106 427.2, filed Jun. 19, 2013, both of which are incorporated by reference in their entirety.

The present invention relates to a method for making tools and/or handling equipment available in the treatment space of a treatment machine.

For the treatment of workpieces, in particular in small and medium batches, the use of machine tools and machining centers is known from the prior art. Here, the individual workpieces are fed to a treatment space of a treatment machine, where they can be treated with a different tool. After treatment has been carried out, the workpieces can be removed from the treatment machine again, individually or else jointly, and if appropriate fed to treatment processes arranged downstream.

It is also known to remove the workpieces from workpiece magazines by means of gantry loaders or articulated arm robots and to feed said workpieces to the treatment space of the treatment machine or, in the opposite direction, to deposit said workpieces in the magazine again. Frequently, the use of various tools, which have to be changed manually or automatically, is required for the treatment of the workpieces. For this purpose, revolver heads or else machine-internal tool magazines are known, to which a movable machine spindle is able to make access in order to pick up and deposit tools there.

If the spindle of the machine does not itself pick up the workpieces and treat the same with a stationary tool, the workpieces have to be arranged in the machine bed and fixed before the treatment. This is done manually or by using technical aids by clamping means coordinated specifically with the workpieces.

The treatment process for a workpiece (as a rule, however a plurality of workpieces), in addition to making the workpieces available, therefore demands workpiece-specific preparation handling, intrinsically also diverse, on or in the treatment machine, which is respectively tailored to the nature of the workpieces to be treated and often makes up a not inconsiderable part of the overall process.

It is therefore an object of the invention to provide a method and a device for carrying out the method with which the workpiece-specific means which are needed for the treatment of the workpieces in the treatment machine can be made available in a simple way. Preferably, non-automated preparation handling on the treatment machine should be dispensed with completely.

The object is achieved by a method for making tools and/or handling equipment available in the treatment space for a treatment machine, at least one mobile magazine keeping the tools and/or handling equipment ready, and a loader being provided to transfer the tools and/or handling equipment from the at least one magazine into the treatment space and to return the same from there into the magazine, characterized in that the mobile magazine is positioned in the access area of the loader and keeps at least two different types of tools and/or handling equipment ready for the loader, wherein the types of tool and/or handling equipment include at least workpieces, clamping means, tools, and gripping means. The object is also achieved by a loading system for carrying out such a making available method, comprising at least one mobile magazine, which can be positioned in a fixed location during the performance of the method, for holding tools and/or handling equipment, and a loader for transferring the tools and/or handling equipment from the magazine into the treatment space of a treatment machine, wherein the magazine is designed to hold at least two different types of tools and/or handling equipment, wherein the types of tools and/or handling equipment include at least: workpieces, clamping means, tools, and gripping means. Advantageous embodiments emerge from the sub-claims.

The invention is based on the finding that the tools and/or handling equipment required for the treatment of a workpiece can advantageously be made available jointly in a magazine to which a loader has access, in order to provide the same to the treatment machine or to transfer the same into the treatment space of said machine. The types of tools and/or handling equipment which can be kept ready in the magazine include at least workpieces, clamping means, tools and gripping means. The workpieces form the actual object for the treatment method provided in the treatment machine. The tools are used to treat the workpieces and, for this purpose, must be transferred to the treatment machine in such a way that the latter can use the tools for the treatment. Clamping means are used to fix the workpieces within the treatment space of the treatment machine, as a rule on the machine bed. Gripping means are used to be able to pick up the different tools and/or handling equipment (workpiece, tool, clamping means) out of the magazine. As a rule, different gripping means are required in order to be able to pick up, firstly, tools, secondly, workpieces, or in turn other clamping means. Depending on the type of design of the gripping means, however, a gripping means can also be considered for picking up different tools and/or handling equipment.

The invention is based on the fact that the tools and/or handling equipment assigned to a specific treatment series are made available jointly in a mobile magazine such that a loader is able to access the tools and/or handling equipment in the magazine and can also reach the treatment space of the treatment machine. Differing from the prior art, in which as a rule only the workpieces are conveyed out of a magazine into the treatment space and back into the magazine, the method according to the invention permits in a simple way the complete preparation and supply of the treatment space of the treatment machine with various, preferably all, tools and/or handling equipment which are required to treat the workpieces, since they can be moved onto or into the machine jointly in a magazine. The workpieces and the further tools and/or handling equipment required for their treatment form a unit, which can also be kept for other treatment jobs on other machines.

The method according to the invention is used to make tools and/or handling equipment available in the treatment space of a treatment machine, at least one mobile magazine keeping the tools and/or handling equipment ready. Also provided is a loader to transfer the tools and/or handling equipment from of the magazine into the treatment space and to return the same from there into the magazine. The magazine is positioned in the access area of the loader and, according to the invention, in addition to the tools and/or handling equipment "tool" and "workpiece", contains at least a further type of tools and/or handling equipment ("clamping means" or "gripping means", to which the loader can make access. The idea of making a number of types of tools and/or handling equipment, in the best case all the tools and/or handling equipment, which is required for a treatment series available in a common mobile magazine facilitates and accelerates the treatment process considerably. Thus, the mobile magazine can, for example, contain both the workpieces to be treated and also the tools required for the purpose. The tools are assigned to the workpieces by means of being arranged within the same magazine, so that both types of tools and/or handling equipment are also made available for the use in the treatment machine by arranging the magazine in the access area of the loader, since the loader can transfer both the tools and the workpieces to the treatment machine. Advantageously, it is as a result no longer necessary to keep the treatment tools in stock separately (for example in a separate magazine inside or outside the treatment machine), since they are made available jointly with the workpieces in the magazine.

The magazine can be populated at another point within the workshop for the treatment job without, for example, the tools having to be made available to the treatment machine in a different way. Instead, both the workpieces and the tools together with the magazine get onto or into the treatment machine, where the loader can make access thereto.

The advantage achieved in accordance with the invention becomes still clearer if the magazine also contains clamping means with which the workpieces can be fixed in the machine bed. By means of appropriately driving the loader, the clamping means can then be removed from the magazine and positioned in the machine bed, into which the loader can then insert one or more workpieces for treatment. The tools possibly likewise made available in the magazine can be transferred to the machine in the same way by the loader, for example inserted into the machine spindle or transferred into a tool magazine arranged within the machine. By means of such a completed arrangement in the mobile magazine of all the tools and/or handling means required for the planned treatment, the separate conversion jobs otherwise possibly required, in which for example the clamping means are arranged manually in the machine bed, are also dispensed with. Instead, the machine can remain in a sort of universal readiness for an extremely wide range of treatment jobs, the details of which are defined in more detail only by making the appropriately populated magazine available.

Data relating to the treatment of the workpieces of a specific magazine can be stored in a network or a storage unit. A higher-order control unit can then assign the data assigned to a specific treatment job both to a magazine that has been or is to be populated appropriately and can also drive the treatment machine or the loader appropriately, depending on which magazine is made available for the treatment. The fact that the machine is given all the tools and/or handling equipment needed for the treatment from the mobile magazine and these are also deposited there again following a first treatment job means that the machine is quickly ready for use again for a further job. Said job could be assigned a second, suitably populated magazine, which is positioned in the access area of the loader at the same time or after the first magazine. All the specific tools and/or handling equipment for the treatment of the first job, which have been introduced into the treatment machine temporarily for the purpose, can be guided back into the associated magazine again when the process is completed and—following any short cleaning that may possibly be required—is ready for the next job and/or the next magazine.

As a result of the joint arrangement of the tools and/or handing equipment assigned to a job in an individual mobile magazine, the further advantage results that the workpieces of a following further treatment series on another treatment machine can be fed in easily and quickly. For this purpose, it is merely necessary for the magazine having the associated tools and/or handling equipment to be fed to the other treatment machine, which can possibly also make access by means of loaders to other tools and/or handling equipment, in particular tools, stocked in the magazine. Once more, the advantage of the invention shows itself to be particularly good when the gripping means required to grip the workpieces are likewise stocked in the magazine and thus also carried along from one machine to the next. The gripping means for the workpieces are frequently specifically configured. Therefore, the loader of a second treatment machine can use the same gripping means to pick up the workpieces as was done by the loader on a previously used first treatment machine.

This also applies in the same way to gripping means with which the clamping means for the workpieces are to be picked up out of the magazine and arranged in the machine bed. Following the treatment of a workpiece in a first machine, both the workpiece and then also the clamping means holding the workpiece in the machine bed are fed back into the magazine again and can be used again in the same way on another treatment machine. In this way, the gripping means possibly specifically prepared for the workpieces and clamping means or tools move jointly with the workpieces through the individual treatment stations and thus are always available together with the workpieces in the common magazine. If different gripping means than those for the workpieces themselves are required to pick up tools or clamping means, the suitable different gripping means can be stocked in the magazine together with the other tools and/or handling equipment and carried along in a mobile fashion.

The mobile magazine is expediently arranged outside the treatment machine or the treatment space of the latter during the method. As a result, it can be made available or removed particularly easily. The possibly large multiplicity of individual components stocked in the magazine could additionally restrict the treatment space highly and makes the treatment of individual workpieces impossible, were the magazine to be arranged in the treatment space.

However, the magazine can also be arranged within the treatment machine (for example in an internal magazine area), in order from there to be able to transfer individual components from the magazine into the treatment space of the machine.

The invention includes the idea that the tools and/or handling equipment kept ready in the magazine can be picked up by a loader and fed to the treatment machine. The loader can be implemented as a robot which has an adequate number of axes and has a loading head. In order to be able to pick up different tools and/or handling equipment from the magazine, it may be necessary to keep different gripping means ready, to which the loader can make access. For example, the gripping means can be constructed with a standardized interface, via which the loading head can be connected to the gripping means. Furthermore, each gripping means can have specific holding elements, which are specifically prepared and configured to pick up a tool, a workpiece or a clamping means. Therefore, one embodiment of the method comprises the feature according to which the loader picks up a gripper in order to pick up a tool and/or item of handling equipment from the magazine and then, by using the same, remove a workpiece and/or tool and/or a clamping means from of the magazine. If a gripping means is also suitable to pick up different tools and/or handling equipment, under certain circumstances changing the gripping means can be dispensed with.

As a rule, if the positioning of clamping means in the treatment machine is also provided, the loader will firstly couple up to a gripper in the magazine or pick up the latter with its loading head such that, by using the gripper, a clamping means likewise stocked in the magazine can be moved out of the magazine into the machine bed. If the clamping means is, for example, a component of a zero-point clamping system, the clamping means can also be fixed in the machine bed without manual intervention. If tools are also to be provided to the treatment machine, the loader could then deposit the gripping means for the clamping means in the magazine again, in order subsequently to couple up to a gripping means for picking up tools. By using this new gripping means, which is likewise stocked in the magazine, one tool or else a plurality of tools can then be transferred to the treatment machine. In order, finally, to be able to insert the workpieces made available in the magazine into the clamping means that have previously been arranged in the machine bed for the treatment the loader can if necessary couple up again to another gripping means which is specifically configured to pick up the workpieces. Such a gripping means could, for example, have two pick-up areas, so that an already treated workpiece could be removed from the clamping means of the machine bed in the first pick-up area, and then an as yet untreated workpiece kept in stock in the second pick-up area could then be inserted into the previously emptied clamping means. As a result, the number of movements of the loader between magazine and treatment space can be reduced.

A somewhat expanded embodiment of the method according to the invention comprises the arrangement of a magazine having tools and/or handling equipment in the access area of a loader which is also able to serve the treatment space of a treatment machine. The positioning of at least one clamping means to be removed from the magazine in the treatment space is then carried out, in order subsequently to fix a workpiece there by using the clamping means. Alternatively or additionally, the loader can remove one or more tools from the magazine and place them in the treatment space or in a machine-internal tool magazine belonging to the treatment machine. Once again alternatively or additionally, the positioning of at least one workpiece to be removed from the magazine in a clamping means arranged in the treatment space can be carried out, in order then to perform the treatment of the workpiece. According to the invention, the loader is able to move all these tools and/or handling equipment into the treatment space and out of the latter and ultimately set them down again in the common magazine for the tools and/or handling equipment.

Apart from the aforementioned tools and/or handling equipment (workpieces, tools, clamping means, gripping means), other means which are required for the treatment of the workpieces can also be contained in the magazine as tools and/or handling equipment. Preferably, it is not necessary for all the tools and/or handling equipment from the magazine to be used completely on a single machine. They may also be necessary only for specific treatment series on selected machines and otherwise remain in the magazine.

A particularly advantageous embodiment of the method results when at least one workpiece is made available already clamped in a clamping means in the magazine. This may be expedient for a repeatable positioning accuracy when the workpiece is intended to remain connected continuously to a clamping means for a plurality of treatment series and/or on one or more different machines. The clamping means having the at least one workpiece can therefore be inserted into a further clamping means, matched thereto, in the machine bed (for example a zero point clamping system). Following the treatment, the workpiece together with the clamping means holding the latter directly is released from the zero point clamping system once more and inserted back into the magazine by the loader.

This is particularly advantageous if a plurality of workpieces are clamped on a clamping means in the manner of a pallet. The loader can therefore introduce this plurality of workpieces jointly into the treatment space by moving a pallet, in order to fix the pallet to a clamping means there. This advantageously reduces the necessary movements of the loader.

In the same way, a plurality of tools could also be provided in a common holder in the magazine, so that these can also be introduced simultaneously into the treatment space. For example the tools could be fed temporarily to a machine-internal tool magazine via a movable machine spindle, by the spindle removing the tools one after another from the common holder and transferring the same into the internal magazine. Returning the tools from the treatment machine can be carried out in the opposite sense.

Expediently, the magazine is arranged in a fixed location during the method according to the invention. Differing from the prior art, in which workpiece magazines frequently have to be pushed forward line by line in order to make it possible for a gantry loader to make access to all the workpieces, the magazine according to the invention can remain standing in a fixed location in the access area of the loader for the entire duration of the treatment of the workpieces. Vertical or horizontal feed means for the magazine are thus not required if the loader is able to reach all the tools and/or handling equipment in the fixed-location magazine. Suitable fixing means, in particular on the floor, are able to ensure that the magazine assumes and maintains an accurately defined fixed-location position relative to the loader. Latching means and stops which act between the magazine and the fixing means can be helpful here. Fixing means for arranging a plurality of magazines in the access area of a common loader are also considered here. Different treatment jobs which are co-determined by appropriate population of different magazines can thus be carried out shortly one after another on the same treatment machine. It is also conceivable to make access to a plurality of mobile magazines for a treatment operation if the tools and/or handling equipment required for the treatment cannot or should not all be made available in a magazine.

In order to carry out a treatment series (this is intended to mean identically repeated treatment in the treatment machine for all the workpieces stocked in the magazine), it may be expedient to assign each magazine a data set. The data set should contain information about the tools and/or handling equipment kept ready in the magazine, which can also be made accessible to a higher-order control unit. In addition to information relating to the workpieces (material, job number, etc.), specific designations for the tools or clamping means or gripping means stored or to be stored in the magazine can also be stored. For the tools, wear data which has to be taken into account during the treatment may also be of interest. Furthermore, the data set can also contain parameters related to the treatment of the workpieces contained in the magazine, wherein the control unit drives the treatment machine and the loader by utilizing the data set relating to treatment of the workpieces. The data set can be assigned uniquely to the respective magazine, for example via a bar code applied to the magazine, via RFID means or other identification means known to those skilled in the art. The data set can also be accessible or capable of being changed via a data network.

The loading system according to the invention for carrying out the above-described method comprises at least one mobile magazine, which can be positioned in a fixed location during the performance of the method and which is designed to hold tools and/or handling equipment. The system further comprises a loader for transferring the tools and/or handling equipment from the magazine into the treatment space of a treatment machine and back, wherein the magazine is designed to hold different types of tools and/or handling equipment simultaneously, the latter including: workpieces W, clamping means S, tools Z and gripping means G. According to one embodiment, at least three different types of tools and/or handling equipment, which includes workpieces W and tools Z, can be kept in stock in the magazine simultaneously. Preferably at least four different types of tools and/or handling equipment are kept in stock in the magazine simultaneously. Although the gripping means, which also rank among the tools and/or handling equipment, are not provided to remain in the treatment space of the treatment machine, "transferring the tools and/or handling equipment into the treatment space" is also intended to be understood to mean the movement of the gripping means by the loader.

Preferably, the loader is mobile relative to the treatment machine and can be fixed in a fixed location temporarily to serve a magazine. The loader therefore does not have to be coupled to the treatment machine and instead can be placed in the vicinity of a treatment machine as required such that it is able to reach into the treatment space thereof. In the process, however, no component of the loader is intended to project permanently into the treatment space of the treatment machine. As a result, the treatment machine also remains available for other treatment operations to some extent requiring manual interventions, without a loader or a magazine having to be arranged close to the treatment space. The loading system, comprising at least one mobile magazine and the loader, can therefore be positioned temporarily on a treatment machine as required.

According to an advantageous embodiment of the invention, means for image recognition (see means for image recognition 12 in FIG. 3) are provided for the loading system. Therefore, data relating to the tools and/or handling equipment kept in stock in the magazine can be acquired and transmitted to a higher-order control unit. The data can in particular contain information relating to type and/or position and/or state of the tools and/or handling equipment arranged in the magazine, in order to be able to control the movements of the loader appropriately. The means for image recognition can also read codes applied directly to the magazine (for example bar codes) and transfer the same to a control unit used for the treatment machine. In this way, the system is able to create or expand data relevant to the treatment. Plausibility control (e.g.: "does the bar code agree with the workpieces acquired via imaging in the magazine?") can also be performed via the imaging means.

In the following text, an embodiment of the invention is to be explained in more detail by using a pictorial example. Here:

Figure 1:
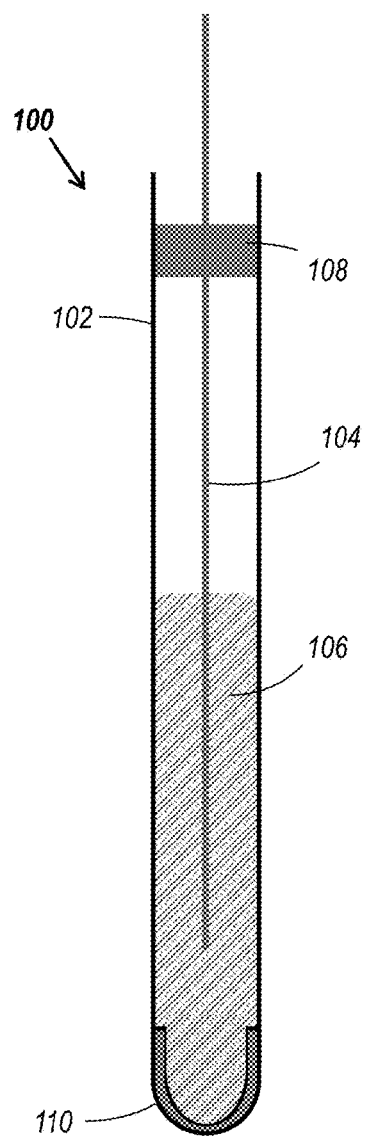
FIG. 1 shows a magazine according to the invention with various tools and/or handling equipment.

FIG. 1 shows a magazine 2 for holding different tools and/or handling equipment. The magazine 2 comprises a horizontal base plate with fixing means arranged thereunder, in order to be able to position the magazine in a fixed location. Provided on the base plate is a deposition area for a clamping means S and two gripping means $G_1$ and $G_2$. The clamping means S is a tool or an item of handling equipment in which workpieces can be clamped temporarily—in particular for treatment. The clamping means S can, for example, contain two clamping jaws that can be moved toward each other and which can clamp the workpiece. The clamping means S can be inserted into a clamping means S', which is arranged in the machine bed of a treatment machine 5 illustrated in FIG. 2. The clamping means S' is a zero point clamping system and can also hold a plurality of clamping means S illustrated in the magazine 2 according to FIG. 1.

The magazine 2 according to FIG. 1 also contains a first gripping means $G_1$. By using this gripping means $G_1$ a loader 3 illustrated in FIG. 2 can pick up the clamping means S from the magazine 2 and transfer the same into the treatment space 4 or the clamping means S' of the treatment machine 5 arranged there. For this purpose, the gripping means $G_1$ can be connected temporarily to the head 3' of the loader 3. Via an actuating mechanism, not specifically illustrated and capable of being triggered by the loader 3, the gripping means $G_1$ arranged on the head 3' can then pick up and move the clamping means S out of the magazine.

Alternatively, the loader 3 can also fix another gripping means $G_2$ temporarily to the head 3'. By using this gripping means $G_2$, workpieces W arranged above the base plate in the magazine can be removed and fed to the treatment machine 5. The workpieces W are inserted between short horizontal projecting supporting struts for this purpose. The gripping means $G_2$ comprises clamping jaws that can be moved toward each other, which are to be moved toward each other by an amount via an actuating mechanism, not specifically illustrated, in order to clamp a workpiece W arranged between the same and in this way to be able to remove the same out of the magazine 2. In order to accelerate the treatment method and to reduce the movements of the loader 3, the gripping means $G_2$ comprises two opposite pairs of clamping jaws. It is therefore possible to position a workpiece to be treated in the treatment space 4 and to pick up another workpiece previously treated there, in order to move the latter back into the magazine 2 again.

The magazine 2 can also contain workpieces W' which, jointly or in each case individually, have already been clamped in a clamping means S. This latter case is illustrated as a detail on the left in FIG. 1.

The loader 3 can pick up and deposit and change the gripping means G as desired by using its loading head 3', in order specifically to be able to make access to clamping means S, workpieces W or else tools Z. The latter are arranged in the uppermost section of the magazine 2 in mountings provided for the purpose. Via a gripper $G_3$, shown in FIG. 3 but not illustrated in the magazine 2, which would be constructed specifically to pick up the tools, these tools Z can also be transferred by means of the loader 3 to the treatment machine 5 and guided back from there.

Therefore, the magazine 2 contains all the tools and/or handling equipment (tools Z, workpieces W, clamping means S and gripping means G) planned for a treatment series in the treatment machine 5 in a compactly assembled form. The common arrangement of all the necessary tools and/or handling equipment in a mobile magazine functioning as a unit simplifies the performance of the workpiece treatment, since, for example, tools or clamping means do not have to be fed to the treatment machine on separate paths, from different magazines arranged separately from one another, or manually.

Figure 2:
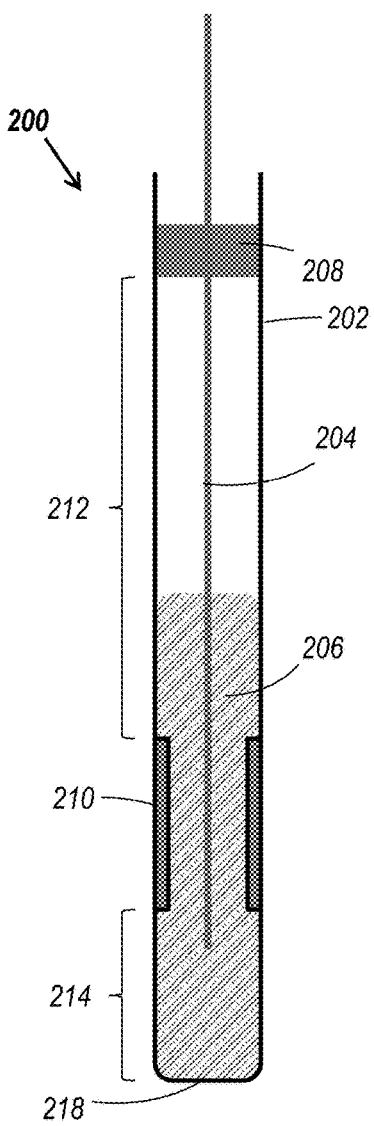
FIG. 2 shows a magazine and a loader on a treatment machine.

FIG. 2 shows the magazine 2 in a fixed-location arrangement close to a treatment machine 5. A loader 3 has access with its head 3' firstly to the tools and/or handling equipment kept ready in the magazine 2 (and no longer specifically designated here) and, secondly, to the treatment space 4 of the treatment machine 5. The loader 3 is also fixed to the floor in a fixed location but, if required as a mobile unit, can likewise be removed easily just like the magazine 3, in order to make the treatment machine 4 easily accessible for other jobs (also manually).

Fixing means 20 on the floor are made available to fix a further magazine, not illustrated in FIG. 2 (but schematically illustrated in FIG. 3), temporarily in the access area of the loader 3 in order to be able to remove tools and/or handling equipment therefrom (not all the fixing means are labelled in FIG. 2).

A control unit 10, which is able to exchange signals with the loader 3 and the treatment machine 5, is used to control the treatment of the individual workpieces kept in stock in the magazine 2. On the basis of data that can be stored in the control unit 10, the latter coordinates the moment of the loader 3 as well as the relative treatment movements of a machine spindle, not illustrated in FIG. 2, which is able to pick up a tool from the magazine 2. Furthermore, the control unit 10 also performs the activation of gripping means which the loader 3 picks up on the head 3' thereof.

The arrangement illustrated in FIG. 2 permits the preparation and performance of workpiece treatment in an efficient way. By using the same, clamping means S from the magazine can be arranged in the machine bed. Workpieces W can be inserted from the magazine 2 into the clamping means S, S' thus placed. Tools Z kept in stock in the magazine can be transferred to a machine spindle or a machine-internal tool magazine 14 (See FIG. 3). Various grippers $G_1$, $G_2$ for picking up the different tools and/or handling equipment can be picked up from the magazine by the loader, in order therewith to be able to pick up the further tools and/or handling equipment. Following the treatment of all workpieces, all the tools and/or handling equipment can be returned to the magazine 2 again, which can then be transferred to another treatment machine or another production process.

The invention claimed is:

1. A method for making available tools and/or handling equipment in a treatment space of a treatment machine, at least one mobile magazine keeping the tools and/or handling equipment available, and a loader being provided to transfer the tools and/or handling equipment from the at least one mobile magazine into the treatment space and to return the same from there into the at least one mobile magazine, the method comprising:
    prior to a treatment by the treatment machine, moving the at least one mobile magazine from a remote location to a fixed magazine location in an access area of the loader;
    securing the at least one mobile magazine in the fixed magazine location for the duration of the treatment by the treatment machine, wherein the at least one mobile magazine keeps at least three different types of tools and/or handling equipment available for the loader, wherein the types of tool and/or handling equipment include at least tools and/or handling equipment selected from the group consisting of: workpieces, clamping means for clamping a workpiece, tools, gripping means for gripping a workpiece, gripping means for gripping a tool or gripping means for gripping a clamping means, and wherein the at least one mobile magazine keeps the tools and/or handling equipment available; and
    removing the at least one mobile magazine from the fixed magazine location after the treatment by the treatment machine.

2. The method as claimed in claim 1, characterized in that the at least one mobile magazine is arranged in the fixed magazine location outside the treatment space of the treatment machine.

3. The method as claimed in claim 1, wherein the types of tools and/or handling equipment available for the loader include a workpiece and a gripping means for gripping a workpiece, characterized in that the loader picks up the gripping means for gripping a workpiece and then, by using the gripping means for gripping a workpiece, removes the workpiece from the at least one mobile magazine.

4. The method as claimed in claim 1, additionally comprising:
    positioning, by means of the loader, of at least one
        $b_1$) clamping means to be removed from the at least one mobile magazine and placed in the treatment space, in order to fix a workpiece in the treatment space by using the clamping means,
        $b_2$) tool to be removed from the at least one mobile magazine and placed in the treatment space or in a machine-internal tool magazine belonging to the treatment machine, or
        $b_3$) workpiece to be removed from the at least one mobile magazine and fixed in a clamping means arranged in the treatment space.

5. The method as claimed in claim 1, characterized in that a workpiece in the at least one mobile magazine is provided clamped in a clamping means, in order to transfer the workpiece together with the clamping means into the treatment space, wherein the clamping means carries the workpiece.

6. The method as claimed in claim 1, characterized in that the loader deposits at least some of the tools and/or handling equipment removed from the at least one mobile magazine specifically in the at least one mobile magazine again.

7. The method as claimed in claim 1, characterized in that the at least one mobile magazine contains all the workpieces, tools, and handling equipment which are needed for a treatment series of the workpieces in the treatment machine.

8. The method as claimed in claim 7, characterized in that a data set that is assigned to the at least one mobile magazine and can be evaluated or stored in a control unit is created, containing information about the tools and/or handling equipment kept available in the at least one mobile magazine.

9. The method as claimed in claim 8, characterized in that the data set comprises parameters related to the treatment of the workpieces contained in the at least one mobile magazine, wherein the control unit drives the treatment machine and the loader by utilizing the data set relating to at least some still outstanding treatment of the workpieces contained in the at least one mobile magazine.

10. The method as claimed in claim 1, additionally comprising positioning a second mobile magazine in the access area of the loader, wherein the at least one mobile magazine and the second mobile magazine are present at the same time in the access area of the loader, and wherein tools and/or handling equipment for the same or different treatment jobs are kept available in the magazines.

11. The method of claim 1, additionally comprising loading the magazine at the remote location with a complete set of the tools and/or handling equipment needed for the treatment by the treatment machine, prior to moving the at least one mobile magazine to the fixed magazine location from the remote location.

12. The method as claimed in claim 1, wherein the types of tools and/or handling equipment available for the loader include a tool and a gripping means for gripping a tool, characterized in that the loader picks up the gripping means for gripping a tool and then, by using the gripping means for gripping a tool, removes the tool from the at least one mobile magazine.

13. The method as claimed in claim 1, wherein the types of tools and/or handling equipment available for the loader include a clamping means and a gripping means for gripping a clamping means, characterized in that the loader picks up the gripping means for gripping a clamping means and then, by using the gripping means for gripping a clamping means, removes the clamping means from the at least one mobile magazine.

\* \* \* \* \*

UNITED STATES PATENT AND TRADEMARK OFFICE
CERTIFICATE OF CORRECTION

PATENT NO. : 10,213,886 B2
APPLICATION NO. : 14/899095
DATED : February 26, 2019
INVENTOR(S) : Hofmann It is certified that error appears in the above-identified patent and that said Letters Patent is hereby corrected as shown below:

Please delete Pat. No. 10,213,886 B2 in its entirety and insert Pat. No. 10,213,886 B2 in its entirety as shown on the attached pages.

Signed and Sealed this
Fifteenth Day of December, 2020

Andrei Iancu
*Director of the United States Patent and Trademark Office*

(12) United States Patent
Hofmann

(10) Patent No.: US 10,213,886 B2
(45) Date of Patent: Feb. 26, 2019

(54) METHOD FOR MAKING TOOLS AND/OR HANDLING EQUIPMENT AVAILABLE, AND ASSOCIATED DEVICES

(71) Applicant: Klaus Hofmann, Bruck (DE)

(72) Inventor: Klaus Hofmann, Bruck (DE)

( * ) Notice: Subject to any disclaimer, the term of this patent is extended or adjusted under 35 U.S.C. 154(b) by 193 days.

(21) Appl. No.: 14/899,095

(22) PCT Filed: Jun. 18, 2014

(86) PCT No.: PCT/DE2014/100201
§ 371 (c)(1),
(2) Date: Dec. 16, 2015

(87) PCT Pub. No.: WO2014/202054
PCT Pub. Date: Dec. 24, 2014

(65) Prior Publication Data
US 2016/0114444 A1    Apr. 28, 2016

(30) Foreign Application Priority Data
Jun. 19, 2013 (DE) .................. 10 2013 106 427

(51) Int. Cl.
*B23Q 3/157* (2006.01)
*B23Q 7/10* (2006.01)
*B23Q 7/04* (2006.01)
*B23Q 3/155* (2006.01)
(Continued)

(52) U.S. Cl.
CPC ..... *B23Q 3/15526* (2013.01); *B23Q 3/15536* (2016.11); *B23Q 3/15539* (2016.11); *B23Q 7/046* (2013.01); *B23Q 7/10* (2013.01); *B23Q 7/1426* (2013.01); *B65G 47/90* (2013.01); *B23Q 3/15503* (2016.11); *B23Q 3/15546* (2013.01); *Y10T 29/5196* (2015.01); *Y10T 483/10* (2015.01); *Y10T 483/134* (2015.01);
(Continued)

(58) Field of Classification Search
CPC ........ Y10T 483/16; B23Q 2003/15537; B23Q 3/15503; B23Q 3/15536; B23Q 7/10; B23Q 3/15539
USPC ....................................... 483/14, 1
See application file for complete search history.

(56) References Cited

U.S. PATENT DOCUMENTS

| 4,587,716 A | 5/1986 | Bytow |
| 4,845,835 A * | 7/1989 | Schneider ............... B23H 7/26 414/1 |

(Continued)

FOREIGN PATENT DOCUMENTS

| DE | 2060957 A1 | 5/1972 |
| DE | 33 20 762 A1 | 12/1984 |

(Continued)

OTHER PUBLICATIONS

International Search Report for Application No. PCT/DE2014/100201, dated Oct. 1, 2014.
(Continued)

*Primary Examiner* — Erica E Cadugan
(74) *Attorney, Agent, or Firm* — Knobbe, Martens, Olson & Bear, LLP

(57) ABSTRACT

The invention relates to a method and a device for making tools and/or handling equipment available for a treatment machine, wherein a mobile magazine contains at least two different types of tools and/or handling equipment together.

13 Claims, 3 Drawing Sheets

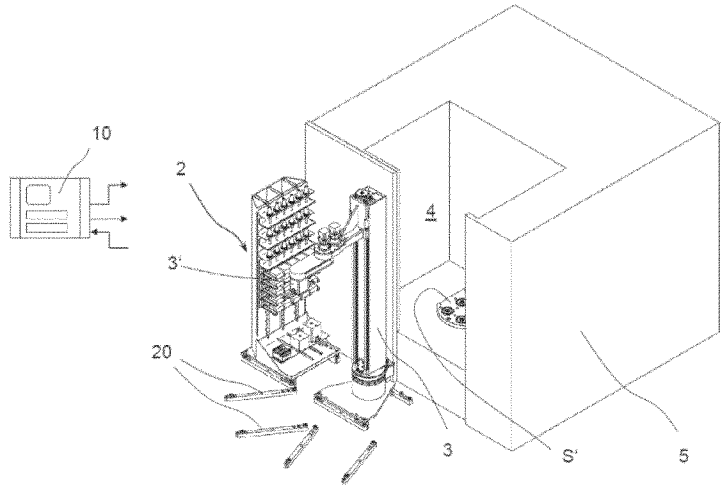

US 10,213,886 B2
Page 2

(51) Int. Cl.
 *B23Q 7/14* (2006.01)
 *B65G 47/90* (2006.01)
(52) U.S. Cl.
 CPC ............ *Y10T 483/16* (2015.01); *Y10T 483/18* (2015.01); *Y10T 483/1845* (2015.01)

(56) References Cited

U.S. PATENT DOCUMENTS

| | | | | |
|---|---|---|---|---|
| 5,281,194 | A | * | 1/1994 | Schneider .......... B23Q 3/15526 211/1.52 |
| 5,803,886 | A | * | 9/1998 | Schweizer ............. B23Q 7/045 483/31 |
| 2008/0040911 | A1 | * | 2/2008 | De Koning ...... G05B 19/41825 483/1 |
| 2011/0194917 | A1 | | 8/2011 | Miksch |

FOREIGN PATENT DOCUMENTS

| | | |
|---|---|---|
| DE | 20 2005 012 039 U1 | 12/2006 |
| DE | 10 2009 035 121 A1 | 2/2011 |
| DE | 10 2010 001 724 A1 | 8/2011 |
| EP | 0517651 A1 | 12/1992 |
| EP | 1927430 A2 | 6/2008 |
| JP | S56-126552 | 10/1981 |
| JP | 60-46829 | 3/1985 |
| JP | 04-105845 | 4/1992 |
| JP | 04-115855 | 4/1992 |
| JP | 05-177516 | 7/1993 |
| JP | 2008-517788 | 5/2008 |
| WO | WO 2007/012366 | 2/2007 |

OTHER PUBLICATIONS

Office Action issued in German patent application No. 10 2013 106 427.2 dated Jun. 23, 2016.
Office Action issued in Japanese Patent Application No. 2016-520282 dated May 15, 2018.
Decision of Rejection dated Nov. 13, 2018 for Japanese Patent Application No. 2016-520282.

* cited by examiner

METHOD FOR MAKING TOOLS AND/OR HANDLING EQUIPMENT AVAILABLE, AND ASSOCIATED DEVICES

RELATED APPLICATIONS

This application is a U.S. National Phase under 35 U.S.C. § 371 of the International Patent Application No. PCT/DE2014/100201, filed Jun. 18, 2014, and published on Dec. 24, 2014 as WO 2014/202054, which claims the benefit of German Patent Application No. 10 2013 106 427.2, filed Jun. 19, 2013, both of which are incorporated by reference in their entirety.

The present invention relates to a method for making tools and/or handling equipment available in the treatment space of a treatment machine.

For the treatment of workpieces, in particular in small and medium batches, the use of machine tools and machining centers is known from the prior art. Here, the individual workpieces are fed to a treatment space of a treatment machine, where they can be treated with a different tool. After treatment has been carried out, the workpieces can be removed from the treatment machine again, individually or else jointly, and if appropriate fed to treatment processes arranged downstream.

It is also known to remove the workpieces from workpiece magazines by means of gantry loaders or articulated arm robots and to feed said workpieces to the treatment space of the treatment machine or, in the opposite direction, to deposit said workpieces in the magazine again. Frequently, the use of various tools, which have to be changed manually or automatically, is required for the treatment of the workpieces. For this purpose, revolver heads or else machine-internal tool magazines are known, to which a movable machine spindle is able to make access in order to pick up and deposit tools there.

If the spindle of the machine does not itself pick up the workpieces and treat the same with a stationary tool, the workpieces have to be arranged in the machine bed and fixed before the treatment. This is done manually or by using technical aids by clamping means coordinated specifically with the workpieces.

The treatment process for a workpiece (as a rule, however a plurality of workpieces), in addition to making the workpieces available, therefore demands workpiece-specific preparation handling, intrinsically also diverse, on or in the treatment machine, which is respectively tailored to the nature of the workpieces to be treated and often makes up a not inconsiderable part of the overall process.

It is therefore an object of the invention to provide a method and a device for carrying out the method with which the workpiece-specific means which are needed for the treatment of the workpieces in the treatment machine can be made available in a simple way. Preferably, non-automated preparation handling on the treatment machine should be dispensed with completely.

The object is achieved by a method for making tools and/or handling equipment available in the treatment space for a treatment machine, at least one mobile magazine keeping the tools and/or handling equipment ready, and a loader being provided to transfer the tools and/or handling equipment from the at least one magazine into the treatment space and to return the same from there into the magazine, characterized in that the mobile magazine is positioned in the access area of the loader and keeps at least two different types of tools and/or handling equipment ready for the loader, wherein the types of tool and/or handling equipment include at least workpieces, clamping means, tools, and gripping means. The object is also achieved by a loading system for carrying out such a making available method, comprising at least one mobile magazine, which can be positioned in a fixed location during the performance of the method, for holding tools and/or handling equipment, and a loader for transferring the tools and/or handling equipment from the magazine into the treatment space of a treatment machine, wherein the magazine is designed to hold at least two different types of tools and/or handling equipment, wherein the types of tools and/or handling equipment include at least: workpieces, clamping means, tools, and gripping means. Advantageous embodiments emerge from the sub-claims.

The invention is based on the finding that the tools and/or handling equipment required for the treatment of a workpiece can advantageously be made available jointly in a magazine to which a loader has access, in order to provide the same to the treatment machine or to transfer the same into the treatment space of said machine. The types of tools and/or handling equipment which can be kept ready in the magazine include at least workpieces, clamping means, tools and gripping means. The workpieces form the actual object for the treatment method provided in the treatment machine. The tools are used to treat the workpieces and, for this purpose, must be transferred to the treatment machine in such a way that the latter can use the tools for the treatment. Clamping means are used to fix the workpieces within the treatment space of the treatment machine, as a rule on the machine bed. Gripping means are used to be able to pick up the different tools and/or handling equipment (workpiece, tool, clamping means) out of the magazine. As a rule, different gripping means are required in order to be able to pick up, firstly, tools, secondly, workpieces, or in turn other clamping means. Depending on the type of design of the gripping means, however, a gripping means can also be considered for picking up different tools and/or handling equipment.

The invention is based on the fact that the tools and/or handling equipment assigned to a specific treatment series are made available jointly in a mobile magazine such that a loader is able to access the tools and/or handling equipment in the magazine and can also reach the treatment space of the treatment machine. Differing from the prior art, in which as a rule only the workpieces are conveyed out of a magazine into the treatment space and back into the magazine, the method according to the invention permits in a simple way the complete preparation and supply of the treatment space of the treatment machine with various, preferably all, tools and/or handling equipment which are required to treat the workpieces, since they can be moved onto or into the machine jointly in a magazine. The workpieces and the further tools and/or handling equipment required for their treatment form a unit, which can also be kept for other treatment jobs on other machines.

The method according to the invention is used to make tools and/or handling equipment available in the treatment space of a treatment machine, at least one mobile magazine keeping the tools and/or handling equipment ready. Also provided is a loader to transfer the tools and/or handling equipment from of the magazine into the treatment space and to return the same from there into the magazine. The magazine is positioned in the access area of the loader and, according to the invention, in addition to the tools and/or handling equipment "tool" and "workpiece", contains at least a further type of tools and/or handling equipment ("clamping means" or "gripping means"), to which the loader can make access. The idea of making a number of types of tools and/or handling equipment, in the best case all the tools and/or handling equipment, which is required for a treatment series available in a common mobile magazine facilitates and accelerates the treatment process considerably. Thus, the mobile magazine can, for example, contain both the workpieces to be treated and also the tools required for the purpose. The tools are assigned to the workpieces by means of being arranged within the same magazine, so that both types of tools and/or handling equipment are also made available for the use in the treatment machine by arranging the magazine in the access area of the loader, since the loader can transfer both the tools and the workpieces to the treatment machine. Advantageously, it is as a result no longer necessary to keep the treatment tools in stock separately (for example in a separate magazine inside or outside the treatment machine), since they are made available jointly with the workpieces in the magazine.

The magazine can be populated at another point within the workshop for the treatment job without, for example, the tools having to be made available to the treatment machine in a different way. Instead, both the workpieces and the tools together with the magazine get onto or into the treatment machine, where the loader can make access thereto.

The advantage achieved in accordance with the invention becomes still clearer if the magazine also contains clamping means with which the workpieces can be fixed in the machine bed. By means of appropriately driving the loader, the clamping means can then be removed from the magazine and positioned in the machine bed, into which the loader can then insert one or more workpieces for treatment. The tools possibly likewise made available in the magazine can be transferred to the machine in the same way by the loader, for example inserted into the machine spindle or transferred into a tool magazine arranged within the machine. By means of such a completed arrangement in the mobile magazine of all the tools and/or handling means required for the planned treatment, the separate conversion jobs otherwise possibly required, in which for example the clamping means are arranged manually in the machine bed, are also dispensed with. Instead, the machine can remain in a sort of universal readiness for an extremely wide range of treatment jobs, the details of which are defined in more detail only by making the appropriately populated magazine available.

Data relating to the treatment of the workpieces of a specific magazine can be stored in a network or a storage unit. A higher-order control unit can then assign the data assigned to a specific treatment job both to a magazine that has been or is to be populated appropriately and can also drive the treatment machine or the loader appropriately, depending on which magazine is made available for the treatment. The fact that the machine is given all the tools and/or handling equipment needed for the treatment from the mobile magazine and these are also deposited there again following a first treatment job means that the machine is quickly ready for use again for a further job. Said job could be assigned a second, suitably populated magazine, which is positioned in the access area of the loader at the same time or after the first magazine. All the specific tools and/or handling equipment for the treatment of the first job, which have been introduced into the treatment machine temporarily for the purpose, can be guided back into the associated magazine again when the process is completed and—following any short cleaning that may possibly be required—is ready for the next job and/or the next magazine.

As a result of the joint arrangement of the tools and/or handing equipment assigned to a job in an individual mobile magazine, the further advantage results that the workpieces of a following further treatment series on another treatment machine can be fed in easily and quickly. For this purpose, it is merely necessary for the magazine having the associated tools and/or handling equipment to be fed to the other treatment machine, which can possibly also make access by means of loaders to other tools and/or handling equipment, in particular tools, stocked in the magazine. Once more, the advantage of the invention shows itself to be particularly good when the gripping means required to grip the workpieces are likewise stocked in the magazine and thus also carried along from one machine to the next. The gripping means for the workpieces are frequently specifically configured. Therefore, the loader of a second treatment machine can use the same gripping means to pick up the workpieces as was done by the loader on a previously used first treatment machine.

This also applies in the same way to gripping means with which the clamping means for the workpieces are to be picked up out of the magazine and arranged in the machine bed. Following the treatment of a workpiece in a first machine, both the workpiece and then also the clamping means holding the workpiece in the machine bed are fed back into the magazine again and can be used again in the same way on another treatment machine. In this way, the gripping means possibly specifically prepared for the workpieces and clamping means or tools move jointly with the workpieces through the individual treatment stations and thus are always available together with the workpieces in the common magazine. If different gripping means than those for the workpieces themselves are required to pick up tools or clamping means, the suitable different gripping means can be stocked in the magazine together with the other tools and/or handling equipment and carried along in a mobile fashion.

The mobile magazine is expediently arranged outside the treatment machine or the treatment space of the latter during the method. As a result, it can be made available or removed particularly easily. The possibly large multiplicity of individual components stocked in the magazine could additionally restrict the treatment space highly and makes the treatment of individual workpieces impossible, were the magazine to be arranged in the treatment space.

However, the magazine can also be arranged within the treatment machine (for example in an internal magazine area), in order from there to be able to transfer individual components from the magazine into the treatment space of the machine.

The invention includes the idea that the tools and/or handling equipment kept ready in the magazine can be picked up by a loader and fed to the treatment machine. The loader can be implemented as a robot which has an adequate number of axes and has a loading head. In order to be able to pick up different tools and/or handling equipment from the magazine, it may be necessary to keep different gripping means ready, to which the loader can make access. For example, the gripping means can be constructed with a standardized interface, via which the loading head can be connected to the gripping means. Furthermore, each gripping means can have specific holding elements, which are specifically prepared and configured to pick up a tool, a workpiece or a clamping means. Therefore, one embodiment of the method comprises the feature according to which the loader picks up a gripper in order to pick up a tool and/or item of handling equipment from the magazine and then, by using the same, remove a workpiece and/or a tool and/or a clamping means from of the magazine. If a gripping means is also suitable to pick up different tools and/or handling equipment, under certain circumstances changing the gripping means can be dispensed with.

As a rule, if the positioning of clamping means in the treatment machine is also provided, the loader will firstly couple up to a gripper in the magazine or pick up the latter with its loading head such that, by using the gripper, a clamping means likewise stocked in the magazine can be moved out of the magazine into the machine bed. If the clamping means is, for example, a component of a zero-point clamping system, the clamping means can also be fixed in the machine bed without manual intervention. If tools are also to be provided to the treatment machine, the loader could then deposit the gripping means for the clamping means in the magazine again, in order subsequently to couple up to a gripping means for picking up tools. By using this new gripping means, which is likewise stocked in the magazine, one tool or else a plurality of tools can then be transferred to the treatment machine. In order, finally, to be able to insert the workpieces made available in the magazine into the clamping means that have previously been arranged in the machine bed for the treatment the loader can if necessary couple up again to another gripping means which is specifically configured to pick up the workpieces. Such a gripping means could, for example, have two pick-up areas, so that an already treated workpiece could be removed from the clamping means of the machine bed in the first pick-up area, and then an as yet untreated workpiece kept in stock in the second pick-up area could then be inserted into the previously emptied clamping means. As a result, the number of movements of the loader between magazine and treatment space can be reduced.

A somewhat expanded embodiment of the method according to the invention comprises the arrangement of a magazine having tools and/or handling equipment in the access area of a loader which is also able to serve the treatment space of a treatment machine. The positioning of at least one clamping means to be removed from the magazine in the treatment space is then carried out, in order subsequently to fix a workpiece there by using the clamping means. Alternatively or additionally, the loader can remove one or more tools from the magazine and place them in the treatment space or in a machine-internal tool magazine belonging to the treatment machine. Once again alternatively or additionally, the positioning of at least one workpiece to be removed from the magazine in a clamping means arranged in the treatment space can be carried out, in order then to perform the treatment of the workpiece. According to the invention, the loader is able to move all these tools and/or handling equipment into the treatment space and out of the latter and ultimately set them down again in the common magazine for the tools and/or handling equipment.

Apart from the aforementioned tools and/or handling equipment (workpieces, tools, clamping means, gripping means), other means which are required for the treatment of the workpieces can also be contained in the magazine as tools and/or handling equipment. Preferably, it is not necessary for all the tools and/or handling equipment from the magazine to be used completely on a single machine. They may also be necessary only for specific treatment series on selected machines and otherwise remain in the magazine.

A particularly advantageous embodiment of the method results when at least one workpiece is made available already clamped in a clamping means in the magazine. This may be expedient for a repeatable positioning accuracy when the workpiece is intended to remain connected continuously to a clamping means for a plurality of treatment series and/or on one or more different machines. The clamping means having the at least one workpiece can therefore be inserted into a further clamping means, matched thereto, in the machine bed (for example a zero point clamping system). Following the treatment, the workpiece together with the clamping means holding the latter directly is released from the zero point clamping system once more and inserted back into the magazine by the loader.

This is particularly advantageous if a plurality of workpieces are clamped on a clamping means in the manner of a pallet. The loader can therefore introduce this plurality of workpieces jointly into the treatment space by moving a pallet, in order to fix the pallet to a clamping means there. This advantageously reduces the necessary movements of the loader.

In the same way, a plurality of tools could also be provided in a common holder in the magazine, so that these can also be introduced simultaneously into the treatment space. For example the tools could be fed temporarily to a machine-internal tool magazine via a movable machine spindle, by the spindle removing the tools one after another from the common holder and transferring the same into the internal magazine. Returning the tools from the treatment machine can be carried out in the opposite sense.

Expediently, the magazine is arranged in a fixed location during the method according to the invention. Differing from the prior art, in which workpiece magazines frequently have to be pushed forward line by line in order to make it possible for a gantry loader to make access to all the workpieces, the magazine according to the invention can remain standing in a fixed location in the access area of the loader for the entire duration of the treatment of the workpieces. Vertical or horizontal feed means for the magazine are thus not required if the loader is able to reach all the tools and/or handling equipment in the fixed-location magazine. Suitable fixing means, in particular on the floor, are able to ensure that the magazine assumes and maintains an accurately defined fixed-location position relative to the loader. Latching means and stops which act between the magazine and the fixing means can be helpful here. Fixing means for arranging a plurality of magazines in the access area of a common loader are also considered here. Different treatment jobs which are co-determined by appropriate population of different magazines can thus be carried out shortly one after another on the same treatment machine. It is also conceivable to make access to a plurality of mobile magazines for a treatment operation if the tools and/or handling equipment required for the treatment cannot or should not all be made available in a magazine.

In order to carry out a treatment series (this is intended to mean identically repeated treatment in the treatment machine for all the workpieces stocked in the magazine), it may be expedient to assign each magazine a data set. The data set should contain information about the tools and/or handling equipment kept ready in the magazine, which can also be made accessible to a higher-order control unit. In addition to information relating to the workpieces (material, job number, etc.), specific designations for the tools or clamping means or gripping means stored or to be stored in the magazine can also be stored. For the tools, wear data which has to be taken into account during the treatment may also be of interest. Furthermore, the data set can also contain parameters related to the treatment of the workpieces contained in the magazine, wherein the control unit drives the treatment machine and the loader by utilizing the data set relating to treatment of the workpieces. The data set can be assigned uniquely to the respective magazine, for example via a bar code applied to the magazine, via RFID means or other identification means known to those skilled in the art. The data set can also be accessible or capable of being changed via a data network.

The loading system according to the invention for carrying out the above-described method comprises at least one mobile magazine, which can be positioned in a fixed location during the performance of the method and which is designed to hold tools and/or handling equipment. The system further comprises a loader for transferring the tools and/or handling equipment from the magazine into the treatment space of a treatment machine and back, wherein the magazine is designed to hold different types of tools and/or handling equipment simultaneously, the latter including: workpieces W, clamping means S, tools Z and gripping means G. According to one embodiment, at least three different types of tools and/or handling equipment, which includes workpieces W and tools Z, can be kept in stock in the magazine simultaneously. Preferably at least four different types of tools and/or handling equipment are kept in stock in the magazine simultaneously. Although the gripping means, which also rank among the tools and/or handling equipment, are not provided to remain in the treatment space of the treatment machine, "transferring the tools and/or handling equipment into the treatment space" is also intended to be understood to mean the movement of the gripping means by the loader.

Preferably, the loader is mobile relative to the treatment machine and can be fixed in a fixed location temporarily to serve a magazine. The loader therefore does not have to be coupled to the treatment machine and instead can be placed in the vicinity of a treatment machine as required such that it is able to reach into the treatment space thereof. In the process, however, no component of the loader is intended to project permanently into the treatment space of the treatment machine. As a result, the treatment machine also remains available for other treatment operations to some extent requiring manual interventions, without a loader or a magazine having to be arranged close to the treatment space. The loading system, comprising at least one mobile magazine and the loader, can therefore be positioned temporarily on a treatment machine as required.

According to an advantageous embodiment of the invention, means for image recognition (see means for image recognition 12 in FIG. 3) are provided for the loading system. Therefore, data relating to the tools and/or handling equipment kept in stock in the magazine can be acquired and transmitted to a higher-order control unit. The data can in particular contain information relating to type and/or position and/or state of the tools and/or handling equipment arranged in the magazine, in order to be able to control the movements of the loader appropriately. The means for image recognition can also read codes applied directly to the magazine (for example bar codes) and transfer the same to a control unit used for the treatment machine. In this way, the system is able to create or expand data relevant to the treatment. Plausibility control (e.g.: "does the bar code agree with the workpieces acquired via imaging in the magazine?") can also be performed via the imaging means.

In the following text, an embodiment of the invention is to be explained in more detail by using a pictorial example. Here:

FIG. 1 shows a magazine according to the invention with various tools and/or handling equipment, and FIG. 2 shows a magazine and a loader on a treatment machine.

Figure 3:
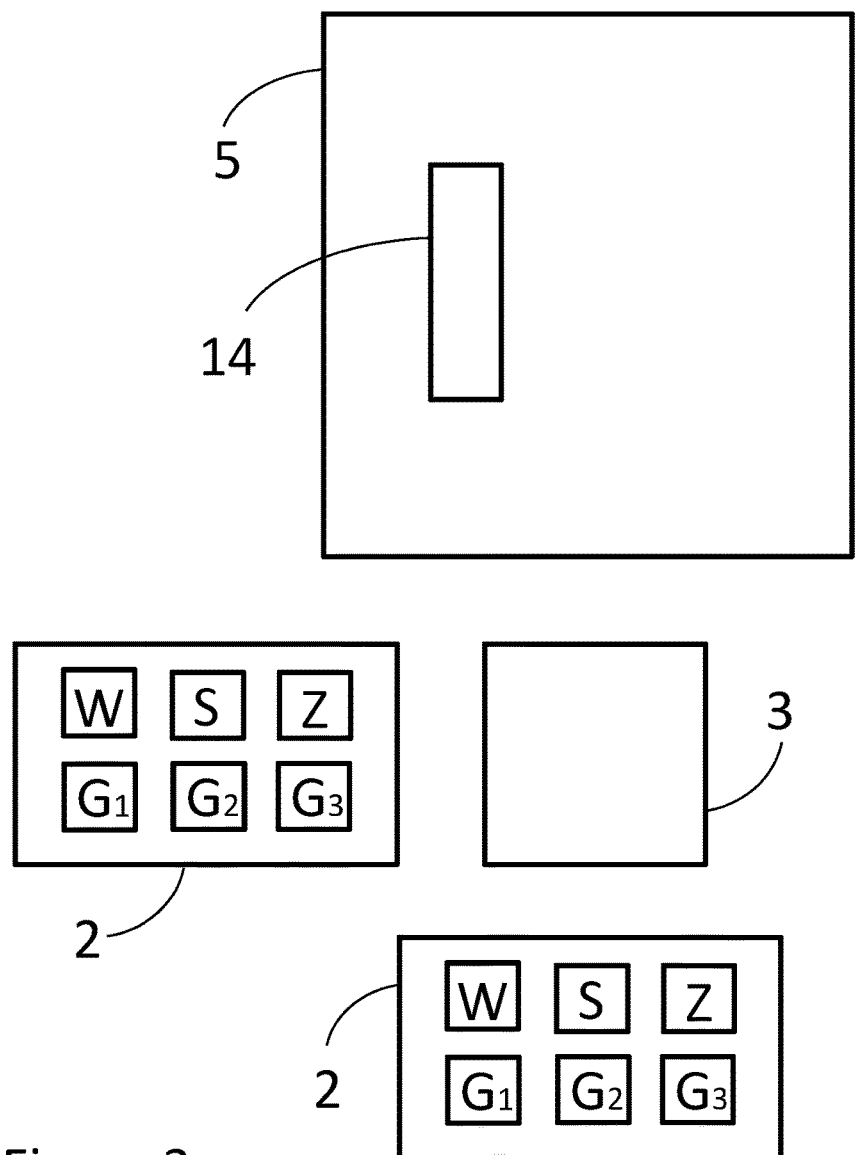
FIG. 3 shows another embodiment of a treatment machine including a loader and a plurality of magazines.
Figure 4B:
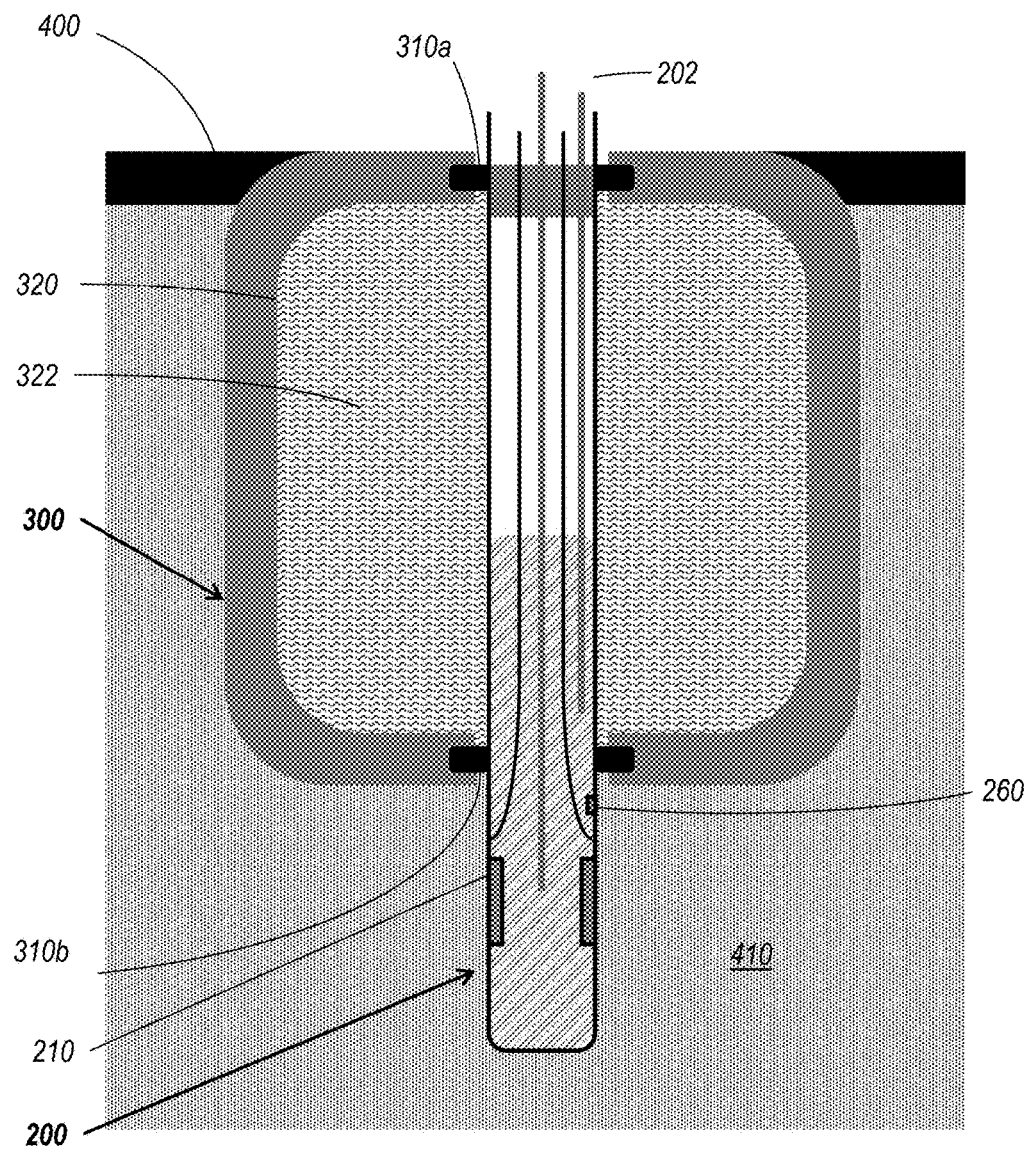
Figure 5A:
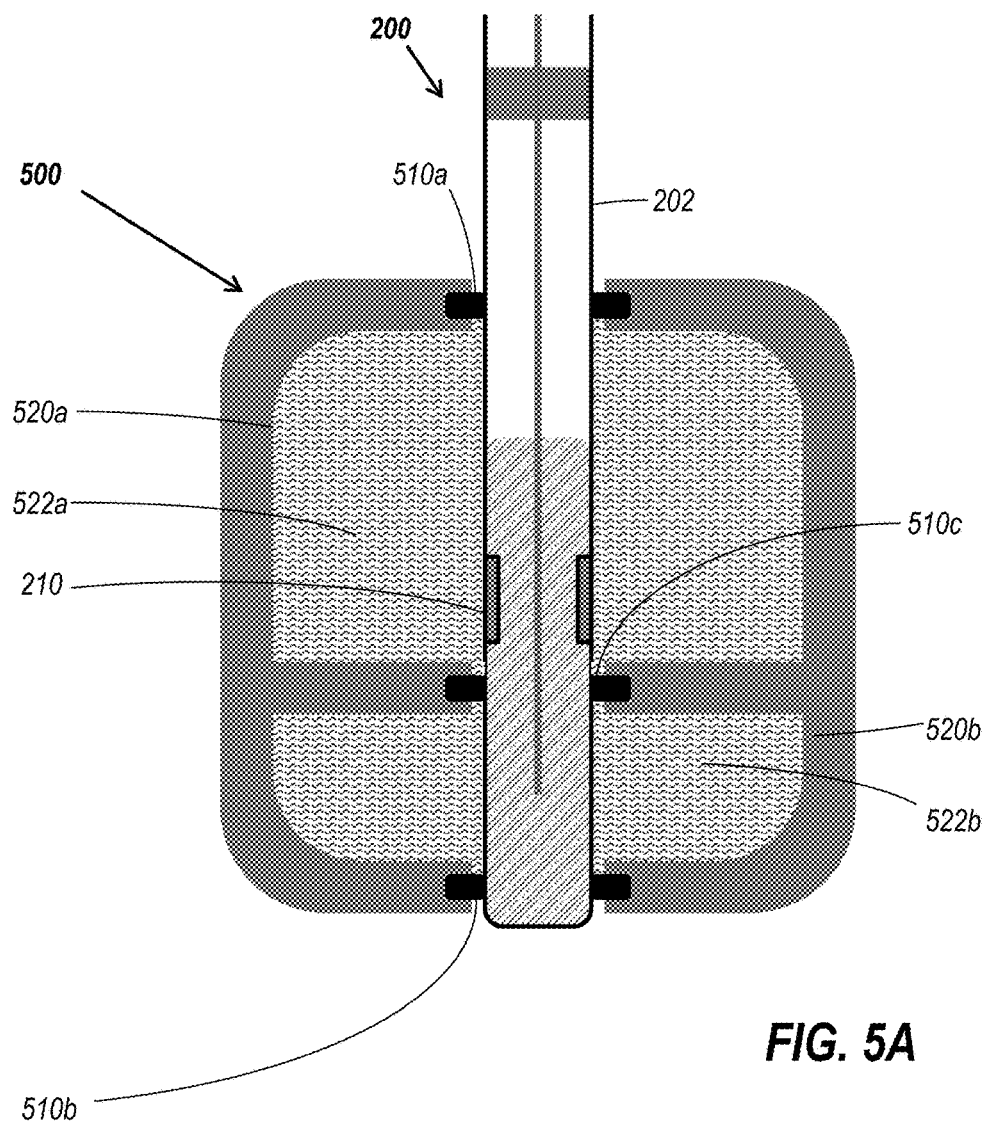
Figure 5B:
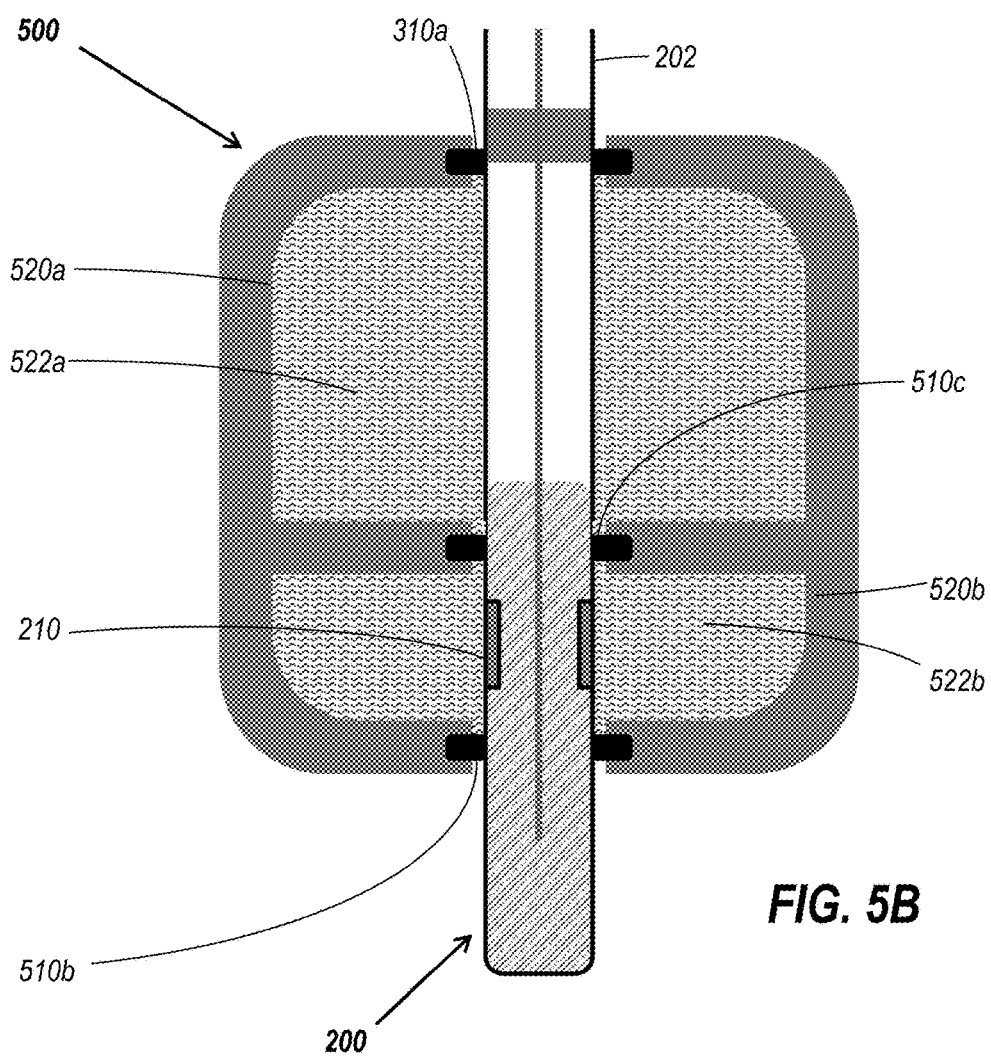
Figure 5C:
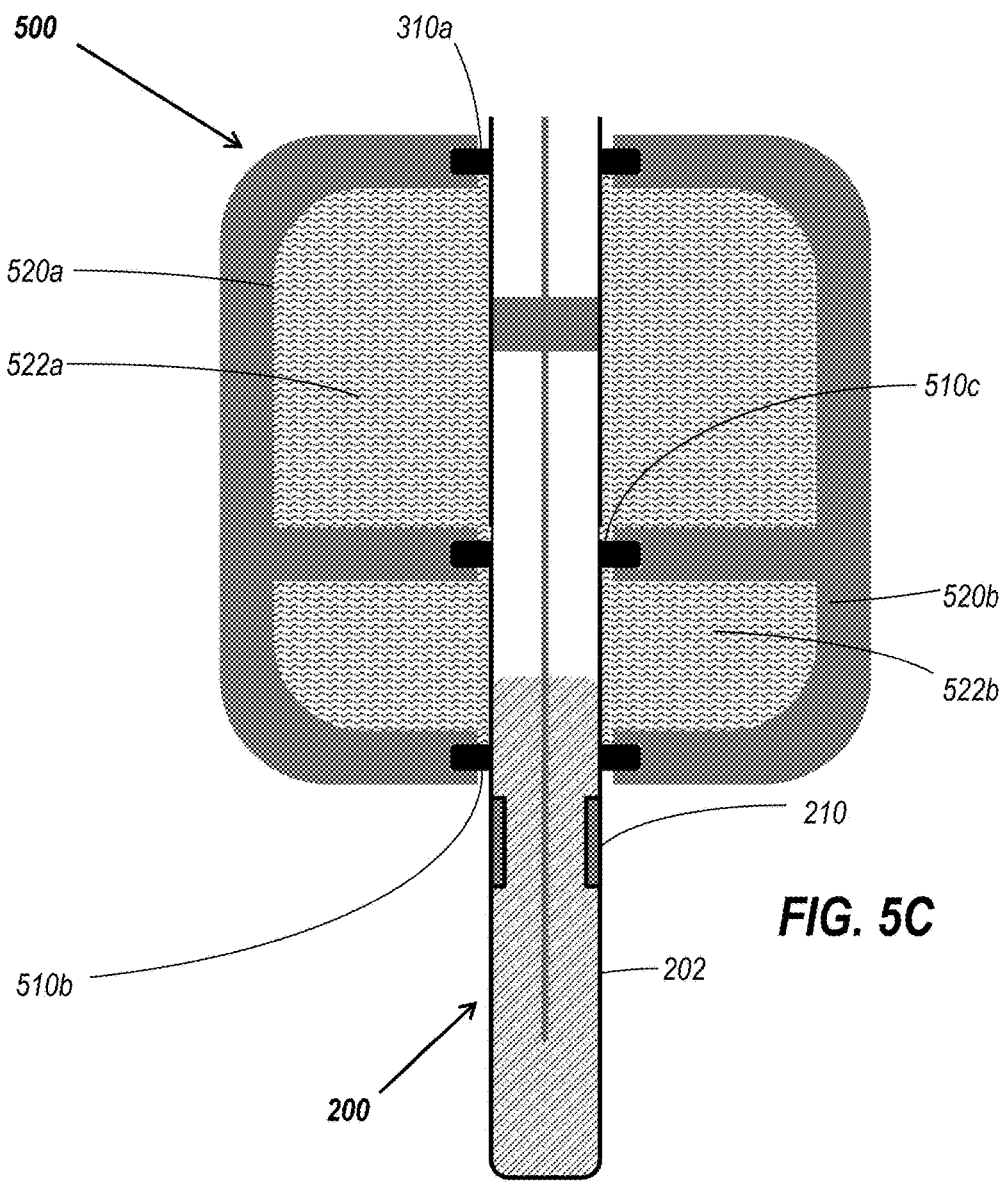
Figure 6:
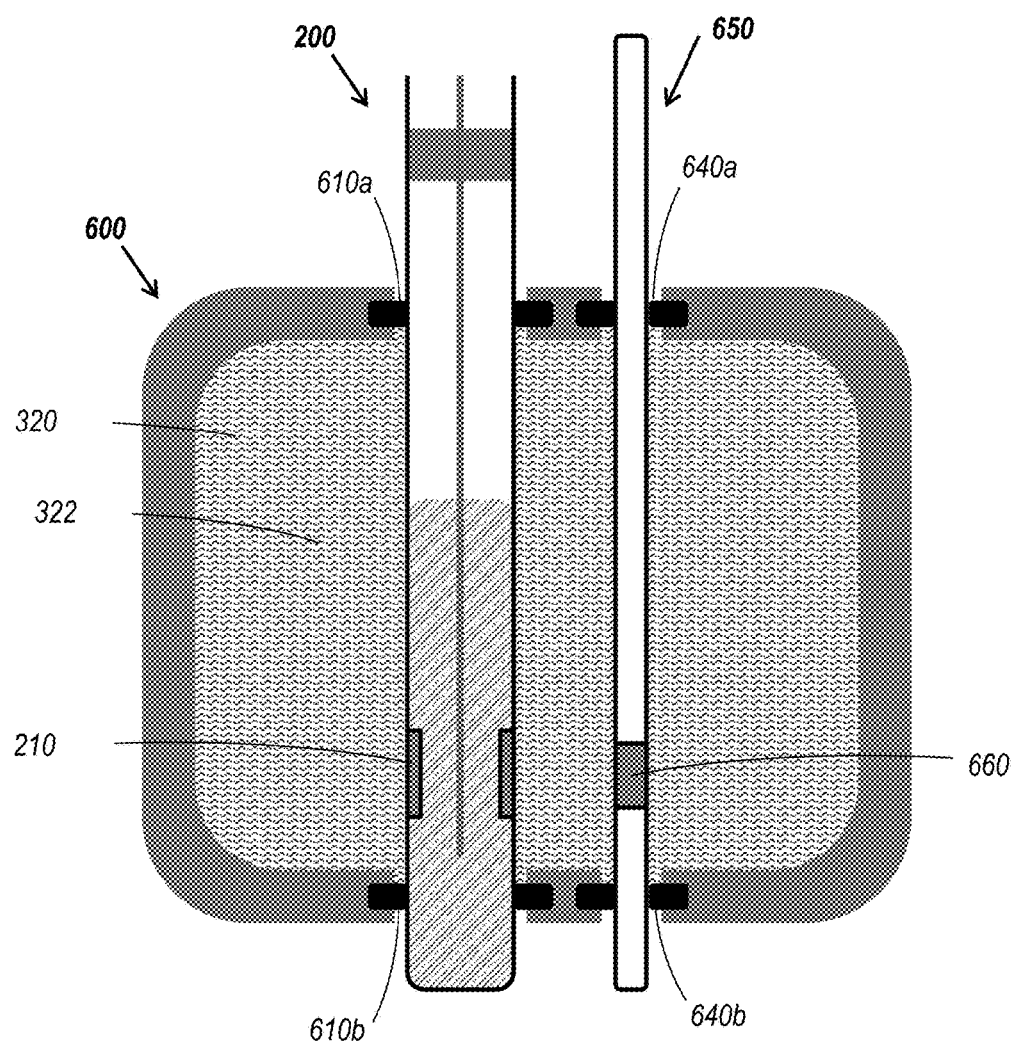
Figure 1:
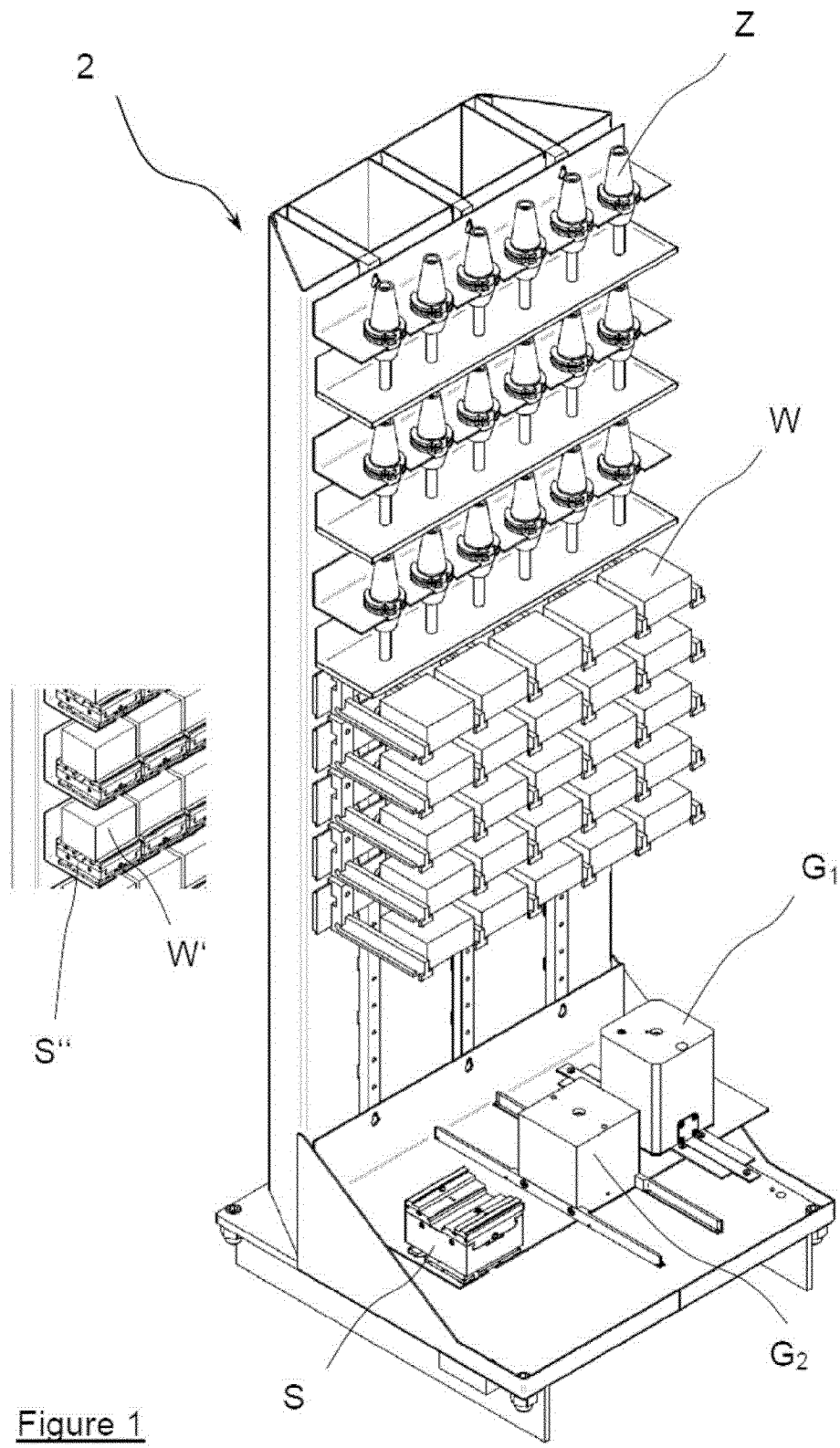
Figure 2:
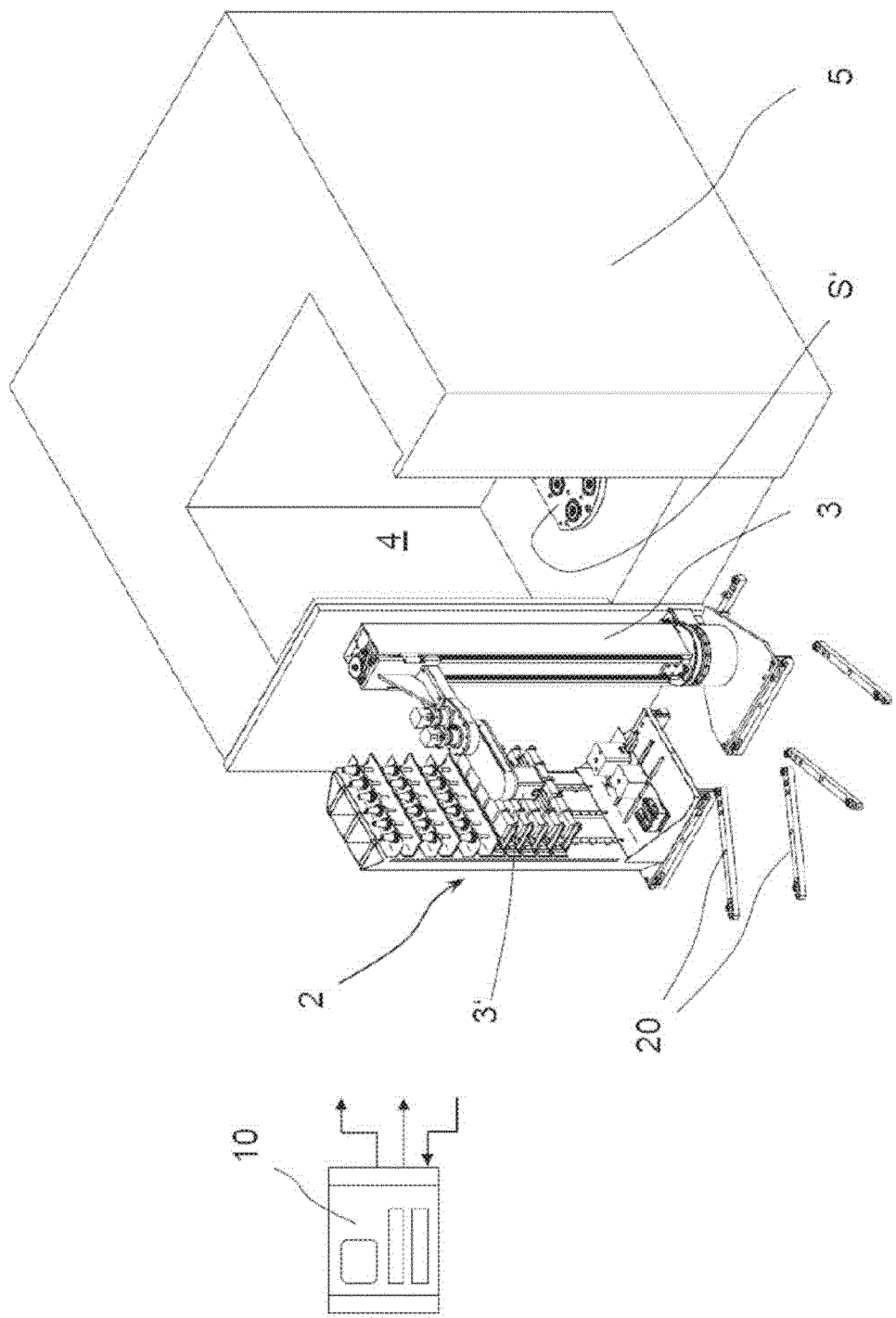
Figure 3:
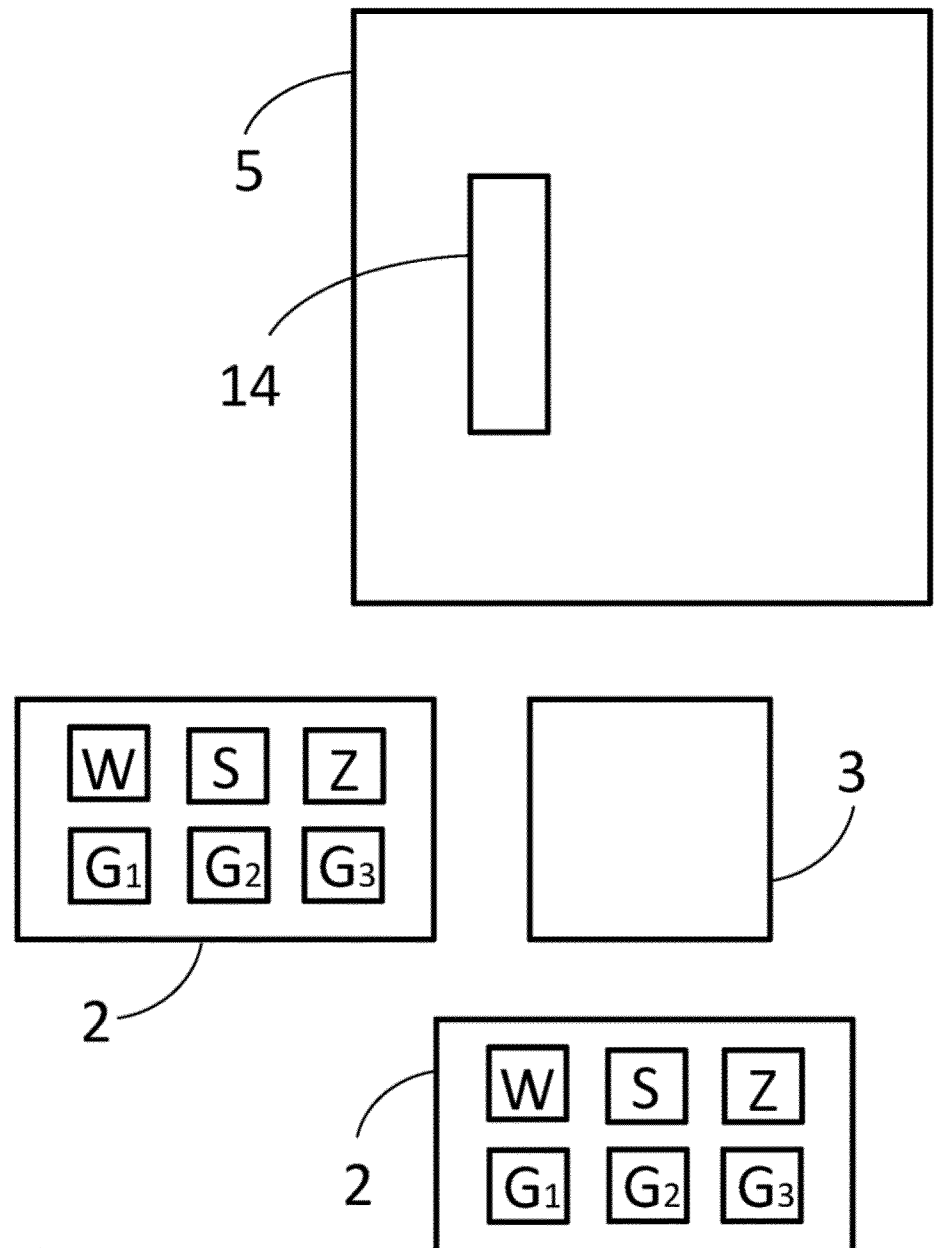

FIG. 3 shows another embodiment of a treatment machine including a loader and a plurality of magazines.

FIG. 1 shows a magazine 2 for holding different tools and/or handling equipment. The magazine 2 comprises a horizontal base plate with fixing means arranged thereunder, in order to be able to position the magazine in a fixed location. Provided on the base plate is a deposition area for a clamping means S and two gripping means $G_1$ and $G_2$. The clamping means S is a tool or an item of handling equipment in which workpieces can be clamped temporarily—in particular for treatment. The clamping means S can, for example, contain two clamping jaws that can be moved toward each other and which can clamp the workpiece. The clamping means S can be inserted into a clamping means S', which is arranged in the machine bed of a treatment machine 5 illustrated in FIG. 2. The clamping means S' is a zero point clamping system and can also hold a plurality of clamping means S illustrated in the magazine 2 according to FIG. 1.

The magazine 2 according to FIG. 1 also contains a first gripping means $G_1$. By using this gripping means $G_1$ a loader 3 illustrated in FIG. 2 can pick up the clamping means S from the magazine 2 and transfer the same into the treatment space 4 or the clamping means S' of the treatment machine 5 arranged there. For this purpose, the gripping means $G_1$ can be connected temporarily to the head 3' of the loader 3. Via an actuating mechanism, not specifically illustrated and capable of being triggered by the loader 3, the gripping means $G_1$ arranged on the head 3' can then pick up and move the clamping means S out of the magazine.

Alternatively, the loader 3 can also fix another gripping means $G_2$ temporarily to the head 3'. By using this gripping means $G_2$, workpieces W arranged above the base plate in the magazine can be removed and fed to the treatment machine 5. The workpieces W are inserted between short horizontal projecting supporting struts for this purpose. The gripping means $G_2$ comprises clamping jaws that can be moved toward each other, which are to be moved toward each other by an amount via an actuating mechanism, not specifically illustrated, in order to clamp a workpiece W arranged between the same and in this way to be able to remove the same out of the magazine 2. In order to accelerate the treatment method and to reduce the movements of the loader 3, the gripping means $G_2$ comprises two opposite pairs of clamping jaws. It is therefore possible to position a workpiece to be treated in the treatment space 4 and to pick up another workpiece previously treated there, in order to move the latter back into the magazine 2 again.

The magazine 2 can also contain workpieces W' which, jointly or in each case individually, have already been clamped in a clamping means S. This latter case is illustrated as a detail on the left in FIG. 1.

The loader 3 can pick up and deposit and change the gripping means G as desired by using its loading head 3', in order specifically to be able to make access to clamping means S, workpieces W or else tools Z. The latter are arranged in the uppermost section of the magazine 2 in mountings provided for the purpose. Via a gripper $G_3$, shown in FIG. 3 but not illustrated in the magazine 2, which would be constructed specifically to pick up the tools, these tools Z can also be transferred by means of the loader 3 to the treatment machine 5 and guided back from there.

Therefore, the magazine 2 contains all the tools and/or handling equipment (tools Z, workpieces W, clamping means S and gripping means G) planned for a treatment series in the treatment machine 5 in a compactly assembled form. The common arrangement of all the necessary tools and/or handling equipment in a mobile magazine functioning as a unit simplifies the performance of the workpiece treatment, since, for example, tools or clamping means do not have to be fed to the treatment machine on separate paths, from different magazines arranged separately from one another, or manually.

FIG. 2 shows the magazine 2 in a fixed-location arrangement close to a treatment machine 5. A loader 3 has access with its head 3' firstly to the tools and/or handling equipment kept ready in the magazine 2 (and no longer specifically designated here) and, secondly, to the treatment space 4 of the treatment machine 5. The loader 3 is also fixed to the floor in a fixed location but, if required as a mobile unit, can likewise be removed easily just like the magazine 3, in order to make the treatment machine 4 easily accessible for other jobs (also manually).

Fixing means 20 on the floor are made available to fix a further magazine, not illustrated in FIG. 2 (but schematically illustrated in FIG. 3), temporarily in the access area of the loader 3 in order to be able to remove tools and/or handling equipment therefrom (not all the fixing means are labelled in FIG. 2).

A control unit 10, which is able to exchange signals with the loader 3 and the treatment machine 5, is used to control the treatment of the individual workpieces kept in stock in the magazine 2. On the basis of data that can be stored in the control unit 10, the latter coordinates the moment of the loader 3 as well as the relative treatment movements of a machine spindle, not illustrated in FIG. 2, which is able to pick up a tool from the magazine 2. Furthermore, the control unit 10 also performs the activation of gripping means which the loader 3 picks up on the head 3' thereof.

The arrangement illustrated in FIG. 2 permits the preparation and performance of workpiece treatment in an efficient way. By using the same, clamping means S from the magazine can be arranged in the machine bed. Workpieces W can be inserted from the magazine 2 into the clamping means S, S' thus placed. Tools Z kept in stock in the magazine can be transferred to a machine spindle or a machine-internal tool magazine 14 (See FIG. 3). Various grippers $G_1$, $G_2$ for picking up the different tools and/or handling equipment can be picked up from the magazine by the loader, in order therewith to be able to pick up the further tools and/or handling equipment. Following the treatment of all workpieces, all the tools and/or handling equipment can be returned to the magazine 2 again, which can then be transferred to another treatment machine or another production process.

The invention claimed is:

1. A method for making available tools and/or handling equipment in a treatment space of a treatment machine, at least one mobile magazine keeping the tools and/or handling equipment available, and a loader being provided to transfer the tools and/or handling equipment from the at least one mobile magazine into the treatment space and to return the same from there into the at least one mobile magazine, the method comprising:

prior to a treatment by the treatment machine, moving the at least one mobile magazine from a remote location to a fixed magazine location in an access area of the loader;

securing the at least one mobile magazine in the fixed magazine location for the duration of the treatment by the treatment machine, wherein the at least one mobile magazine keeps at least three different types of tools and/or handling equipment available for the loader, wherein the types of tool and/or handling equipment include at least tools and/or handling equipment selected from the group consisting of: workpieces, clamping means for clamping a workpiece, tools, gripping means for gripping a workpiece, gripping means for gripping a tool or gripping means for gripping a clamping means, and wherein the at least one mobile magazine keeps the tools and/or handling equipment available; and removing the at least one mobile magazine from the fixed magazine location after the treatment by the treatment machine.

2. The method as claimed in claim 1, characterized in that the at least one mobile magazine is arranged in the fixed magazine location outside the treatment space of the treatment machine.

3. The method as claimed in claim 1, wherein the types of tools and/or handling equipment available for the loader include a workpiece and a gripping means for gripping a workpiece, characterized in that the loader picks up the gripping means for gripping a workpiece and then, by using the gripping means for gripping a workpiece, removes the workpiece from the at least one mobile magazine.

4. The method as claimed in claim 1, additionally comprising:

positioning, by means of the loader, of at least one $b_1$) clamping means to be removed from the at least one mobile magazine and placed in the treatment space, in order to fix a workpiece in the treatment space by using the clamping means, $b_2$) tool to be removed from the at least one mobile magazine and placed in the treatment space or in a machine-internal tool magazine belonging to the treatment machine, or $b_3$) workpiece to be removed from the at least one mobile magazine and fixed in a clamping means arranged in the treatment space.

5. The method as claimed in claim 1, characterized in that a workpiece in the at least one mobile magazine is provided clamped in a clamping means, in order to transfer the workpiece together with the clamping means into the treatment space, wherein the clamping means carries the workpiece.

6. The method as claimed in claim 1, characterized in that the loader deposits at least some of the tools and/or handling equipment removed from the at least one mobile magazine specifically in the at least one mobile magazine again.

7. The method as claimed in claim 1, characterized in that the at least one mobile magazine contains all the workpieces, tools, and handling equipment which are needed for a treatment series of the workpieces in the treatment machine.

8. The method as claimed in claim 7, characterized in that a data set that is assigned to the at least one mobile magazine and can be evaluated or stored in a control unit is created, containing information about the tools and/or handling equipment kept available in the at least one mobile magazine.

9. The method as claimed in claim 8, characterized in that the data set comprises parameters related to the treatment of the workpieces contained in the at least one mobile magazine, wherein the control unit drives the treatment machine and the loader by utilizing the data set relating to at least some still outstanding treatment of the workpieces contained in the at least one mobile magazine.

10. The method as claimed in claim 1, additionally comprising positioning a second mobile magazine in the access area of the loader, wherein the at least one mobile magazine and the second mobile magazine are present at the same time in the access area of the loader, and wherein tools and/or handling equipment for the same or different treatment jobs are kept available in the magazines.

11. The method of claim 1, additionally comprising loading the magazine at the remote location with a complete set of the tools and/or handling equipment needed for the treatment by the treatment machine, prior to moving the at least one mobile magazine to the fixed magazine location from the remote location.

12. The method as claimed in claim 1, wherein the types of tools and/or handling equipment available for the loader include a tool and a gripping means for gripping a tool, characterized in that the loader picks up the gripping means for gripping a tool and then, by using the gripping means for gripping a tool, removes the tool from the at least one mobile magazine.

13. The method as claimed in claim 1, wherein the types of tools and/or handling equipment available for the loader include a clamping means and a gripping means for gripping a clamping means, characterized in that the loader picks up the gripping means for gripping a clamping means and then, by using the gripping means for gripping a clamping means, removes the clamping means from the at least one mobile magazine.

* * * * *